Sept. 29, 1931.  D. H. KILLEFFER  1,825,073
APPARATUS AND METHOD FOR REFRIGERATING
Filed March 5, 1929
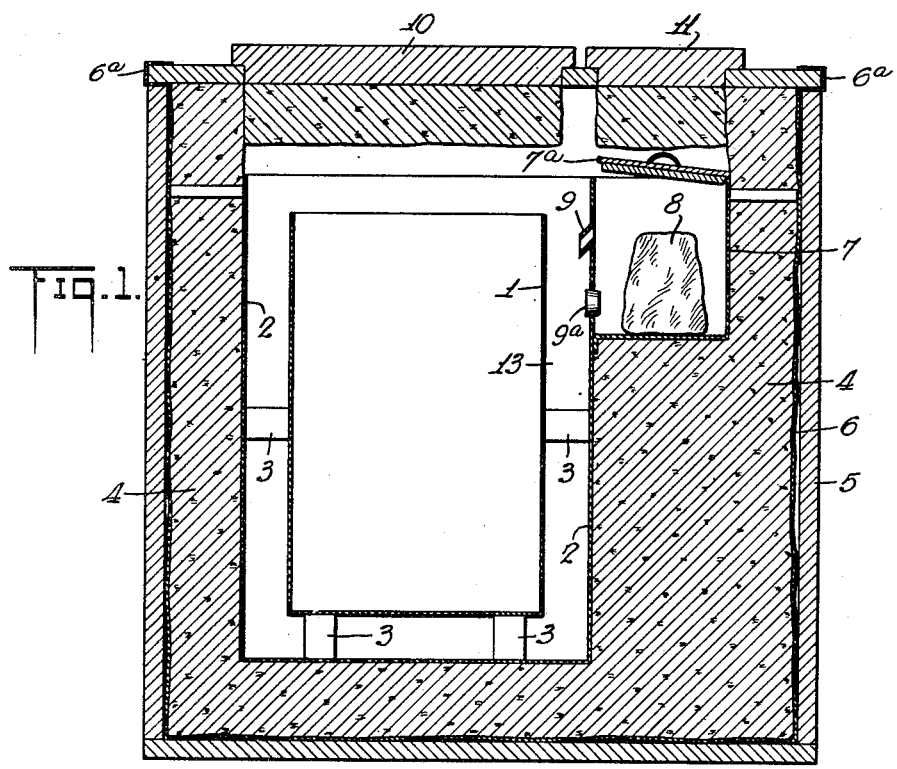
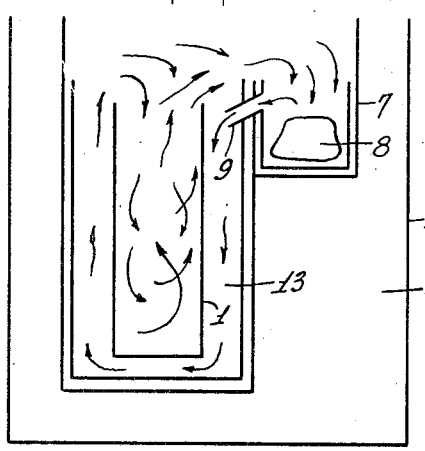
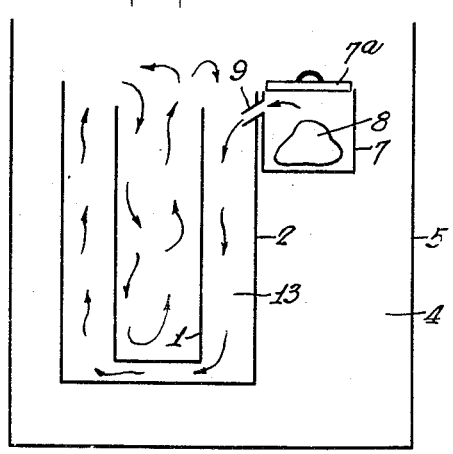
INVENTOR
David H. Killeffer
BY
ATTORNEY Patented Sept. 29, 1931

1,825,073

UNITED STATES PATENT OFFICE

DAVID H. KILLEFFER, OF YONKERS, NEW YORK, ASSIGNOR TO DRYICE EQUIPMENT CORPORATION, OF NEW YORK, N. Y., A CORPORATION OF DELAWARE

APPARATUS AND METHOD FOR REFRIGERATING

Application filed March 5, 1929. Serial No. 344,201.

My present invention relates to refrigerating apparatus in which solid carbon dioxide is used as a refrigerant and as the source of cold gas which flows to various parts of the apparatus. It is shown as embodied in a refrigerating dispensing cabinet particularly designed for storing, refrigerating and dispensing frozen products but by the simplest of expedients it will be equally useful for commodities requiring higher temperatures, as for instance fresh milk. Moreover, certain features of my invention may be embodied in specifically different forms of refrigerative apparatus.

One object of my present invention is to make a simple, cheap but highly efficient unit well adapted for the purposes described, particularly for its use as a refrigerating dispensing cabinet. In its simplest, cheapest form it requires only a box of ordinary packing case construction, an impermeable lining, some compressed kapok, cork or the like, and two tin cans one of which may be an ordinary milk can or a five-gallon ice cream can.

In my application Ser. No. 343,860, I have disclosed how a dispensing cabinet, highly insulated at the bottom and sides and accessible for dispensing the frozen products through the top only, and when in use, is accessible to heat mainly through the top. Where, as in the present case, carbon dioxide gas is used as the refrigerant medium, this is a great advantage because its greater specific gravity as compared with air prevents the gas from spilling out, as it naturally does where access is had through side doors or other low level openings. In case of hard frozen products to be dispensed, and in less degree in the case of fresh milk or the like, this is an important advantage since the frequent openings of the container to dispense the commodity will involve very small loss of the gas and relatively small inflow of outside air.

In my application, Ser. No. 343,988, I have disclosed that the ordinary refrigerating structures and the ordinary cellular insulating materials, from which they are made, including even balsa wood or hard wood, are remarkably permeable for out-leak of the carbon dioxide gas. Also the great advantages that result when the cellular insulation is enclosed in a wholly impermeable casing, so that there can be no escape of carbon dioxide gas except by overflow at the top.

I have combined certain of the more specific features disclosed in said applications, with additional features so that my present invention and the claims therefor are directed to species not specifically claimed in either of said applications.

The above and other features of my invention may be more fully understood from the following description in connection with the accompanying drawings, in which Fig. 1 is a vertical section of a cabinet embodying my invention;

Fig. 2 is a diagrammatic view indicating characteristic flow paths of the warmed up gas when it has full access to the solid carbon dioxide; and Fig. 3 is a similar view indicating the flow when the warmed up gas has no access to the solid carbon dioxide.

In Fig. 1 there is an inner container 1, preferably a removable metal can which is gas-tight except at the top, and in which are stored the perishable products to be dispensed. This can is enclosed in a container 2 of considerably larger cross section and greater height, preferably spaced apart from the walls thereof by brace blocks 3, which may be of balsa wood or other heat insulating material. The container 2 is protected on the bottom and on the sides with a heavy layer of cellular insulating material 4 which may be balsa wood, compressed cork, kapok or the like. This layer of insulating material preferably extends above the level of the open top of container 2 and is exteriorly protected by an outer casing 5, in the nature of a box structure affording physical strength and protection to the contents and having between its inner surface and the insulating material 4 a complete gas-tight envelope 6 of material impermeable to gas. The outer casing or layer 5 may be a substantial hard wood structure while the impermeable material 6 is a thin layer of tin-lead, or pure zinc foil strengthened by a suitable coating material which may be paper or preferably asphalt. For some purposes, the functions of 5 and 6 may be combined by employing a third tin can. Within the protecting layers 4, 5, 6, preferably secured to the outside of the upper part of container 2, is a metal container 7 for the refrigerant 8, which is solid carbon dioxide. This container is preferably gas-tight as to its bottom and side walls, at least up to the overflow openings 9 through which flows the cold gas which is being constantly sublimed from the solid. It need not be of metal and it may be otherwise supported.

As to what constitutes "material impermeable to gas" within the meaning of the expression as herein used and as to what may be considered as equivalents therefor, a proper understanding may be had by reference to my application Ser. No. 343,859, in which it is explained that the novel significance of this phrase is the result of my discoveries that most waterproof and airproof materials are astonishingly permeable to carbon dioxide gas and that when I speak of impenetrable substances, I intend to exclude all such shellacs, paints, varnish, linseed oil, rubber, glue, water glass, soap, metal salicylates, metal insoluble soaps and sizing materials as I have yet been able to find in the market. I intend to include metal in the form of plates, sheets or foil, mica, glass, and bakelite, which are the only ideally impenetrable materials; also, as coating materials, certain varieties of bakelite, varnish or lacquer which were found substantially impenetrable; also all materials nearly enough impenetrable to constitute practically usable equivalents including vaseline, asphalt and paraffin. By use of sheet metal, particularly the asphalt coated foil, the percentage of carbon dioxide gas in the refrigerated space could be raised from a normal of only 25% to 35% for ordinary structures, up to 45% or more for asphalt; 65% or more for vaseline; and 95% for sheet metal, or foil strengthened with asphalt.

Preferably, the holes 9 are proportioned to the normal volume of outflowing gas, so as to pass all of it, and even be large enough to induce a desired rate of downflow of the warmer atmosphere from above the top thereof. This will tend to govern the heating and gas evolution rate in accordance with the temperature and air content of this atmosphere. The extent of this tendency may be controlled by the height of the holes. The lower down they are the higher will be the rate of induced flow. Usually this level will be predetermined relatively low for ice cream and the like, requiring low temperatures and higher for fresh milk and the like. By this expedient alone, the average temperature in the can 2, may be adjusted from above freezing point to below zero F. If desired, holes may be made at different levels and the lower ones plugged, to suit particular uses, as at 9a.

This container 7 may be provided with a cover 7a, which can be positioned so as to afford a fairly tight closure, or may be adjusted to a part open position or may be removed altogether to vary the access of air to the solid carbon dioxide, according to how much it is desired to increase the rate of sublimation of the latter.

Covers 10 and 11, preferably of insulating material, permit access to the refrigerated space for inserting and removing products from the inner container 1 and to the container 7 and cover 7a thereof. A single cover may be used for both purposes, and in either case the warmer gas at the top of the cabinet may be forced out around the edges of these covers or special vents may be provided.

As the solid carbon dioxide 8 in container 7 absorbs heat, it sublimates and evolves about 500 times its volume of cold heavy gas. When this cold gas reaches the level of the outlet 9, it can overflow by gravity into the interspace 13 between containers 1 and 2. If the outlets 9 be somewhat restricted, the level of the pure heavy gas may reach the top of container 7 and there will be a certain amount of static pressure to accelerate flow through 9.

As set forth in my application Ser. No. 343,859 the cover 7a is arranged as a fairly tight closure for the top of container 7, and the outlets may be sufficiently restricted, so that a certain amount of pressure will be built up, imparting a substantial velocity to the gas through the outlet 9 and this may be directed downward by a nozzle, but it will be understood that for the present uses, the cover is not designed to withstand such pressure and it is preferably omitted altogether but, if desired, the cover may be made tight as contemplated by my application Ser. No. 343,859, and the same securing means may be used, if desired.

Whether the cover is on or off and whether or not the gas all flows through outlets 9, such as does flow through said outlets will flow downward in the space 13 and across the bottom and, as heat is absorbed, rises in the interspace. When it submerges the open top of container 1, it will flow down among the perishables stored therein, and if these are separate units, there are usually voids between the units into which the gas penetrates, submerging them in a cold insulating atmosphere of the gas. Since the weight of the gas is greater than that of air, it will displace the air which will be driven to the top of the casing and in a short time the greater part of the air within the container 2 will be forced out by the gas. Even if container 1 has a tight cover, this will happen whenever the cover is removed.

The level of the gas will rise a considerable distance above the top opening in container 1, completely submerging the latter. Upon further rise of the level of the gas above the top of container 2, it will permeate the cellular insulating material 4 and flow down therein by reason of its weight, assisted by the in and out breathing due to varying atmospheric conditions. This keeps the cellular material full of dry gas, driving out the air. This is important because its insulating effect is much greater than that of air and also because it has a peculiar drying effect gradually driving out the moisture and thereby increasing the insulating value of the cellular material.

In the form shown, the cellular material is submerged in gas because the latter can only overflow above the top of the impenetrable liner 6. Thus, we have successively higher overflow levels for the gas, substantially all of the structure being below the level of the impenetrable layer.

The lining 6 may be continued up and over the cover as at 6a but separate strips plastered on with asphalt, may be added or substituted.

Considering the circulation when container 1 is uncovered and contains units, "Eskimo pie" for instance, it will be seen that the gas surrounding units within the container 1 will be warmed by absorption of heat therefrom so that there will be a continuous tendency for the heavy gas to flow in and the warmer gas to rise out of this container into the space above the same. In this space there collects the mixture that is warmest and contains the most air. This warmer gas-air mixture tends to be chilled by and to settle into the container 7 and impart heat to the solid, thus accelerating sublimation. This important region of the circulation may be controlled by predetermining the height, number and size of the holes 9, 9a or by having a cover of some sort—like 7a or even a wad or blanket of kapok.

Fig. 3 shows how, when the cover is in place, sublimation of the solid can only result from heat absorbed through the walls of the container and in such case only a correspondingly reduced volume of perfectly pure carbon dioxide gas will be discharged through said outlet 9.

Fig. 2 indicates diagrammatically the flow tendencies when containers 7 and 1 are without covers and how complete removal of cover 7a from the refrigerant container 7 tends to establish a down circulation of the warm gas from the upper space into the container. Even if some of it is short-circuited through the outlet 9, it will nevertheless be chilled to a very low temperature by the freely evolved gas it mingles with. This gas may be at 110° below zero F., and when its sublimation is accelerated by presence of substantial quantities of air, its temperature may be many degrees lower than this. Similar but less pronounced effects, result when the cover is partially removed, as in Fig. 1.

As before indicated, the inner container 1 is preferably removable and may be an ordinary 5-gallon or 25-gallon ice cream can, an old fashioned milk can such as farmers ship milk in, or any other special container used or adapted for some other special purpose.

While I have disclosed a preferred form of cabinet, I do not wish to restrict myself to the specific structure shown, since many structural variations will be obvious to those skilled in the art which, although different in general appearance or construction, will still involve the novel principles of my invention.

It will be understood that certain very important features of my present invention have their significance and usefulness only in connection with solid carbon dioxide and the gas generated or evolved thereby, and that all of the apparatus claims are to be construed as including these elements in such way and to such extent as may be necessary to define and protect the inventions and discoveries set forth therein.

I claim:—

1. A refrigerant container enclosing solid carbon dioxide, including outer and inner layers of cellular material and an interposed layer of asphalt.

2. A refrigerant container enclosing solid carbon dioxide, including outer and inner layers of cellular material and an interposed layer of thin metal foil strengthened by asphalt.

3. A refrigerant container enclosing solid carbon dioxide, including outer and inner layers of cellular material and an interposed layer of asphalt, and the outer layer consisting of a relatively heavy box structure enclosing and protecting said interposed layer.

4. A refrigerant container enclosing solid carbon dioxide, including outer and inner layers of cellular material and an interposed layer of thin metal foil strengthened by asphalt, and the outer layer consisting of a relatively heavy box structure enclosing and protecting said interposed layer.

5. Refrigerative apparatus including an insulating outer box or container and an inner container for products to be refrigerated, both having closed bottoms and sides so as to be accessible only through the top and the inner container being spaced apart from the inner surface of the outer container so as to afford circulatory interspaces; and a container of solid carbon dioxide also enclosed in said outer container and accessible at the top to the atmosphere in the upper part thereof and discharging refrigerant gas into said interspace through selected outlets formed at different levels below the top thereof.

6. A refrigerative cabinet including an outer case or box having a gas-tight metal foil lining, a heavy layer of cellular insulating material within the foil and a sheet metal can or lining for the latter, all having closed bottoms and sides so as to be accessible, and to permit escape of gas, only through the top thereof; and a container of solid carbon dioxide absorbing heat and discharging gas into said lining can.

7. A refrigerative cabinet including an outer case or box having a gas-tight metal foil lining, a heavy layer of cellular insulating material within the foil and a sheet metal can or lining for the latter, all having closed bottoms and sides so as to be accessible, and to permit escape of gas, only through the top thereof; a container of solid carbon dioxide secured to the exterior of said lining can protected by said cellular material and arranged at a high level so as to be in heat exchange relation to atmosphere in the upper part of said cabinet and discharging refrigerant gas into said lining can.

8. A refrigerative cabinet including an outer case or box having a gas-tight metal foil lining, a heavy layer of cellular insulating material within the foil and a sheet metal can or lining for the latter, all having closed bottoms and sides so as to be accessible, and to permit escape of gas, only through the top thereof; a container for the products to be refrigerated, within, and spaced apart from the lining can so as to afford circulatory interspaces; a container of solid carbon dioxide secured to the exterior of said lining can protected by said cellular material and arranged at a high level so as to be in heat exchange relation to atmosphere in the upper part of said cabinet and discharging refrigerant gas into said interspace.

9. A refrigerative cabinet including an outer case or box having a gas-tight metal foil lining, a heavy layer of cellular insulating material within the foil and a sheet metal can or lining for the latter, all enclosing an interior refrigerated space and having closed bottoms and sides so as to be accessible, and to permit escape of gas, only through the top thereof; a container of solid carbon dioxide secured to the exterior of said lining can protected by said cellular material and arranged at a high level so as to be in heat exchange relation to atmosphere in the upper part of said cabinet and discharging refrigerant gas into said interior refrigerated space through outlets formed at a desired level below the top thereof.

10. A refrigerative cabinet including an outer case or box having means rendering it impenetrable for outflow of carbon dioxide gas, a heavy layer of cellular insulating material within the latter, a sheet metal can or lining within the insulation; all having closed bottoms and sides so as to be accessible, and to permit escape of gas, only through the top thereof; a container of solid carbon dioxide protected by said cellular material and arranged at a high level so as to be accessible to the atmosphere in the upper part of said cabinet and discharging refrigerant gas into said lining can.

11. A refrigerative cabinet including an outer case or box having means rendering it impenetrable for outflow of carbon dioxide gas, a heavy layer of cellular insulating material within the latter, a sheet metal can or lining within the insulation; all having closed bottoms and sides so as to be accessible, and to permit escape of gas, only through the top thereof; and a container for the products to be refrigerated, within, and spaced apart from the lining can so as to afford circulatory interspaces; a container of solid carbon dioxide protected by said cellular material and arranged at a high level so as to be accessible to the atmosphere in the upper part of said cabinet and discharging refrigerant gas into said interspace.

12. A method of regulating temperature of the atmosphere in an outer insulating container of products refrigerated by solid carbon dioxide sublimating and discharging its gas therein, for circulation in refrigerant relation to said products, which method includes enclosing said solid in a container designed to be gas-tight up to a desired out flow level and to admit inflow of said atmosphere at a higher level than the out flow level.

13. A method of regulating temperature of the atmosphere in an outer insulating container of products refrigerated by solid carbon dioxide sublimating and discharging its gas therein, for circulation in refrigerant relation to said products, which method includes enclosing said solid in a container designed to be gas-tight up to a desired out flow level and to admit inflow of said atmosphere at a higher level than the out flow level, and predetermining or adjusting the vertical distance between said levels making it greater for low temperatures and less for higher temperatures.

14. A method of regulating temperature of the atmosphere in an outer insulating container of products refrigerated by solid carbon dioxide sublimating and discharging its gas therein, for circulation in refrigerant relation to said products, which method includes enclosing said solid in a container designed to be gas-tight up to a desired out flow level and designed and arranged to admit inflow of the lighter, warmer mixture from the top part of said structure, into said container at a higher lever than the outflow level.

15. A method of regulating temperature of the atmosphere in an outer insulating container of products refrigerated by solid carbon dioxide sublimating and discharging its gas therein, for circulation in refrigerant relation to said products, which method includes rendering the bottom and sides of said outer container impervious as to carbon dioxide gas and accessible to air only through the top, enclosing said solid in a container designed to be gas-tight up to a desired out flow level, and designed and arranged to admit inflow of the lighter, warmer mixture from the top part of said structure, into said container at a higher level than the outflow level.

Signed at New York, in the county of New York, and State of New York, this 1st day of March, A. D. 1929.

DAVID H. KILLEFFER.